United States Patent
Yamauchi (10) Patent No.: US 9,300,875 B2
(45) Date of Patent: Mar. 29, 2016

(54) IMAGING DEVICE DISPLAY CONTROLLER

(71) Applicant: PANASONIC INTELLECTUAL PROPERTY MANAGEMENT CO., LTD., Osaka-Shi (JP)

(72) Inventor: Hideaki Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/749,708

(22) Filed: Jan. 25, 2013

(65) Prior Publication Data

US 2013/0250158 A1  Sep. 26, 2013

(30) Foreign Application Priority Data

Mar. 23, 2012 (JP) .................... 2012-066610

(51) Int. Cl.
*H04N 5/232* (2006.01)

(52) U.S. Cl.
CPC ....... *H04N 5/23293* (2013.01); *H04N 5/23219* (2013.01)

(58) Field of Classification Search
CPC ............ H04N 5/2251; H04N 5/23293; H04N 5/23219
USPC ........................................ 348/333.01–333.12
See application file for complete search history.

(56) References Cited

U.S. PATENT DOCUMENTS

| | | | | |
|---|---|---|---|---|
| 6,597,817 B1* | 7/2003 | Silverbrook | ................ | 382/289 |
| 8,358,321 B1* | 1/2013 | Weidner | ..................... | 345/659 |
| 2005/0041130 A1* | 2/2005 | Yoon et al. | ............... | 348/333.01 |
| 2008/0225156 A1* | 9/2008 | Kim | .......................... | 348/333.06 |
| 2009/0202180 A1* | 8/2009 | Ericson | ........................ | 382/313 |
| 2010/0295782 A1* | 11/2010 | Binder | .......................... | 345/158 |
| 2010/0316254 A1* | 12/2010 | Kirsch et al. | .................. | 382/103 |
| 2011/0158537 A1* | 6/2011 | Uno | ............................. | 382/190 |
| 2012/0081576 A1* | 4/2012 | Seo et al. | .................... | 348/231.6 |
| 2012/0176508 A1* | 7/2012 | Jeong | ........................ | 348/231.2 |
| 2012/0294533 A1* | 11/2012 | Ikenoue | ....................... | 382/195 |
| 2012/0320249 A1* | 12/2012 | Higashimoto | ........... | 348/333.05 |
| 2013/0050557 A1* | 2/2013 | Moriyasu | ................. | 348/333.06 |
| 2013/0120635 A1* | 5/2013 | Kim | ................... | H04N 5/23219 348/333.06 |

FOREIGN PATENT DOCUMENTS

| | | |
|---|---|---|
| JP | 2003-051970 A | 2/2003 |
| JP | 2007-214999 A | 8/2007 |

\* cited by examiner

*Primary Examiner* — Mekonnen Dagnew
(74) *Attorney, Agent, or Firm* — Shinjyu Global IP (57) ABSTRACT

The imaging device includes an imaging component, a display component, a rotation detector, and a controller. The imaging component is configured to capture a subject and output image data. The display component is configured to change the orientation of a display screen and to display an image based on the image data. The rotation detector is configured to detect the orientation of the display screen of the display component. The controller includes a subject detector and a display controller. The subject detector is configured to detect information specifying a subject. The display controller is configured to control whether or not to rotate a content displayed on the display component according to the detection information of the subject detector and the detection result of the rotation detector.

12 Claims, 5 Drawing Sheets

IMAGING DEVICE DISPLAY CONTROLLER

CROSS-REFERENCE TO RELATED APPLICATIONS

This application claims priority under 35 U.S.C. §119 to Japanese Patent Application No. 2012-066610 filed on Mar. 23, 2012. The entire disclosure of Japanese Patent Application No. 2012-066610 is hereby incorporated herein by reference.

BACKGROUND

1. Field of the Invention

The present invention relates to an imaging device comprising a monitor with which the angle of the display screen can be changed.

2. Description of the Related Art

Among imaging devices such as digital still cameras and movie cameras, there are known types with which it is possible to change the angle of the monitor used to display captured image data and so on (Japanese Laid-Open Patent Application 2003-51970, for example).

Most conventional imaging devices equipped with a monitor such as this allow the display screen of the monitor to be rotated 180 degrees so that it faces the subject side. A configuration is known in which the displayed image is rotated according to the rotation angle of the monitor so that the displayed image as seen from the subject will be in the proper location. This makes it easier to check the image being captured, even when the user wants to use himself as the subject, such as in case of what is known as taking a self-portrait.

SUMMARY

However, with a conventional imaging device such as this, there was the risk that the image would not be rotated at the point intended by the user. Specifically, a problem was that checking the image was difficult. More specifically, when the monitor was rotated to make the monitor easier for the user to see during low-angle imaging, if the monitor was rotated by more than a certain amount, there was the risk that the image would end up being rotated, making it harder to check the image.

The present invention was conceived in light of the above problems, and it is an object thereof to provide an imaging device that is more convenient to use.

The imaging device disclosed herein comprises an imaging component, a display component, a rotation detector, and a controller. The imaging component is configured to capture a subject and outputs image data. The display component is configured to display an image on the basis of the image data, and change the orientation of a display screen. The rotation detector is configured to detect the orientation of the display screen of the display component. The controller includes a subject detector and a display controller. The subject detector is configured to detect information used to specify a subject. The display controller is configured to control whether or not to rotate a content displayed on the display component according to the detection information of the subject detector and the detection result of the rotation detector.

An imaging device that is more convenient to use can be provided with the present invention.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiment 1

The digital camera 100 of Embodiment 1 comprises a vari-angle liquid crystal monitor 123. With this digital camera 100, the display state of the liquid crystal monitor is controlled to be easier for the user to see, by detecting the rotational state of the liquid crystal monitor 123 and recognizing the subject to be captured. The configuration and operation of the digital camera 100 will now be described.

1. Configuration

The configuration of the digital camera 100 will be described through reference to the drawings.

1-1. Configuration of Digital Camera 100

Figure 1:
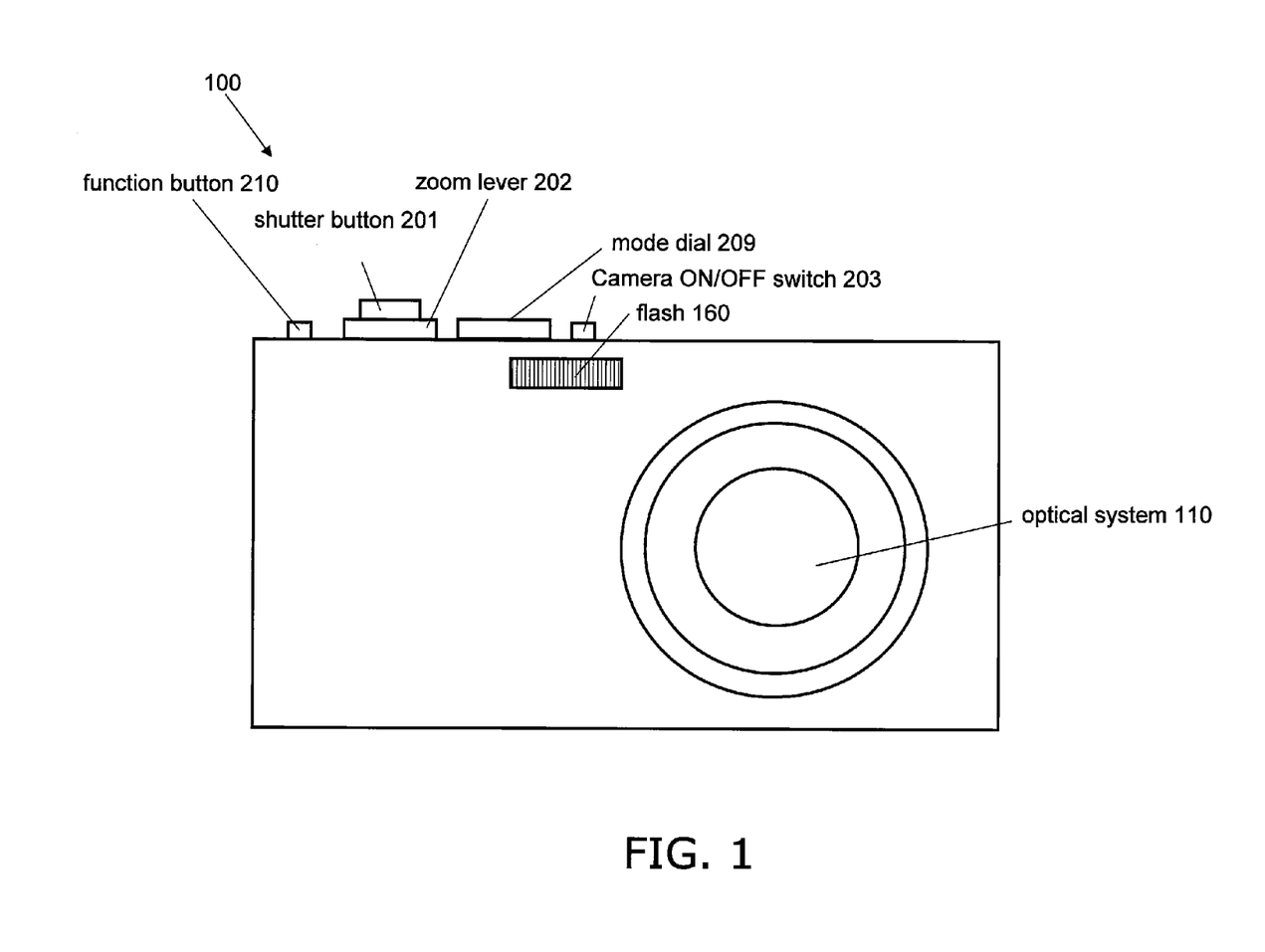
FIG. 1 is a diagram of the configuration of the front face of a digital camera 100 pertaining to Embodiment 1.

FIG. 1 is a diagram of the configuration of the front face of a digital camera 100. The digital camera 100 comprises on its front face a lens barrel (for holding an optical system 110), a flash 160, etc. The digital camera 100 comprises on its top face a shutter button 201, a zoom lever 202, camera ON/OFF switch 203, etc. The digital camera 100 also comprises on its top face a mode dial 209 and a function button 210.

Figure 2:
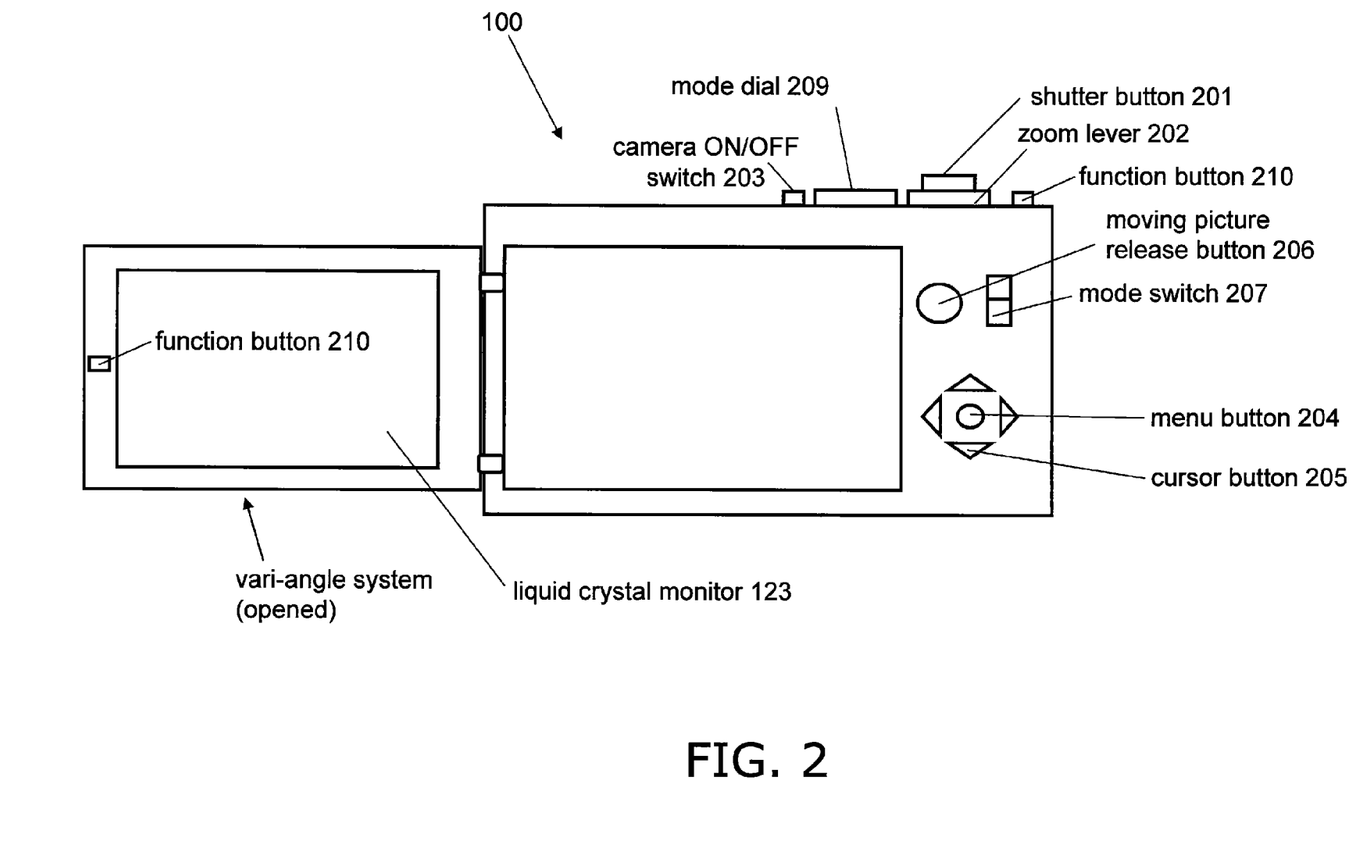
FIG. 2 is a diagram of the configuration of the rear face of the digital camera 100 pertaining to Embodiment 1.

FIG. 2 is a diagram of the configuration of the rear face of the digital camera 100. The digital camera 100 comprises the vari-angle liquid crystal monitor 123, a menu button 204, a cursor button 205, a moving picture release button 206, a mode switch 207, and other such control buttons. The function button 210 is provided on the side of the liquid crystal monitor 123 of the digital camera 100.

Figure 3:
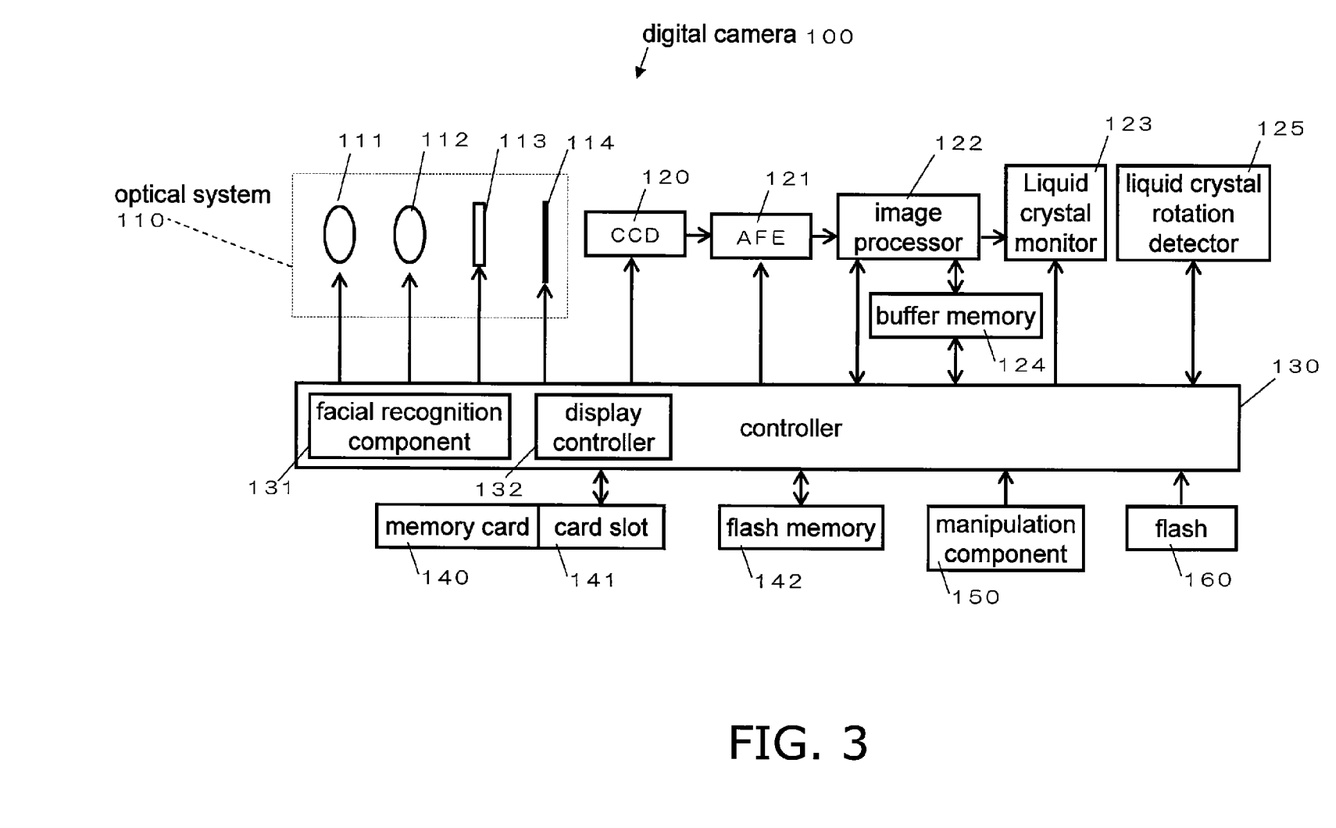
FIG. 3 is a diagram of the electrical configuration of the digital camera 100 pertaining to Embodiment 1.

FIG. 3 is a diagram of the electrical configuration of the digital camera 100. The digital camera 100 uses a CCD image sensor 120 to capture a subject image formed via the optical system 110. The CCD image sensor 120 produces image data on the basis of the captured subject image. The image data produced by imaging is subjected to various kinds of processing at an AFE (analog front end) 121 and an image processor 122. The image data thus produced is recorded to a recording medium, such as a flash memory 142 or a memory card 140. In this embodiment, an example in which the memory card 140 is used as a recording medium is given. The image data recorded to the memory card 140 is displayed on the liquid crystal monitor 123 on the basis of operation of an interface component 150 (an example of an input component) by the user. The various components will now be described in detail through reference to FIGS. 1 to 3.

The optical system 110 is made up of a focus lens 111, a zoom lens 112, an aperture 113, a shutter 114, and so forth. Although not depicted, the optical system 110 may include an optical shake correcting (OIS: optical image stabilizer) lens.

Also, the lenses that make up the optical system 110 may each be constituted by a number of lenses, or may be constituted by a number of groups of lenses.

The focus lens 111 is used to adjust the focal state of the subject. The zoom lens 112 is used to adjust the angle of field of the subject. The aperture 113 is used to adjust the amount of light incident on the CCD image sensor 120. The shutter 114 is used to adjust the exposure time with light incident on the CCD image sensor 120. The focus lens 111, the zoom lens 112, the aperture 113, and the shutter 114 are each driven by a drive unit such as a DC motor or a stepping motor, according to a control signal issued from the controller 130.

The CCD image sensor 120 captures the subject image formed by the optical system 110, and produces image data. When the digital camera 100 is in imaging mode, the CCD image sensor 120 produces a new frame of image data at each specific time interval.

The AFE 121 subjects the image data read from the CCD image sensor 120 to various processing. The various kinds of processing include noise suppression by correlated double sampling, amplification to the input range width of an A/D converter by analog gain controller, and A/D conversion by A/D converter. After this, the AFE 121 outputs the image data to the image processor 122.

The image processing unit 122 subjects the image data outputted from the AFE 121 to various processing. The various kinds of processing include smear correction, white balance correction, gamma correction, YC conversion processing, electronic zoom processing, a compression processing, and decompression processing. The various processing may also include processing other than the types listed here. The image processor 122 stores the image information that has undergone the various processing in a buffer memory 124. The image processor 122 may be constituted by a hard-wired electronic circuit. The image processor 122 may also be constituted by a microprocessor running on a program, or the like. The image processor 122 may also be constituted by a single semiconductor chip along with the controller 130, etc.

The liquid crystal display monitor 123 is provided to the rear face of the digital camera 100. The liquid crystal display monitor 123 is a vari-angle type of monitor. A vari-angle monitor is configured such that the orientation of the display screen of the liquid crystal monitor 123 can be changed. The display screen of the vari-angle liquid crystal monitor 123 can be opened and closed and rotated with respect to the main body. This makes it possible for the display screen of the liquid crystal monitor 123 to be directed to the rear face side and/or the front face side of the digital camera 100. For example, FIG. 2 shows a state in which the display screen has been opened 180 degrees from the main body around the rotational axis in the vertical direction, and the display screen is facing the rear face side. If the display screen is rotated from this state around the rotational axis in the left and right direction, the display screen will face the front face side.

The liquid crystal monitor 123 displays an image based on the image data processed by the image processor 122. The images displayed by the liquid crystal monitor 123 include through-images and recorded images. A through-image corresponds to a series of images in which new frames of image data produced at specific intervals by the CCD image sensor 120 are displayed continuously. Usually, when the digital camera 100 is in imaging mode, the image processor 122 produces a through-image from the image data produced by the CCD image sensor 120. The user can capture an image while checking the composition of the subject by referring to the through-image displayed on the liquid crystal monitor 123. A recorded image corresponds to an image that is reduced to a lower resolution for displaying the high-resolution image data recorded to the memory card 140 on the liquid crystal monitor 123 when the digital camera 100 is in reproduction mode. The high-resolution image data recorded to the memory card 140 is produced by the image processor 122 on the basis of image data produced by the CCD image sensor 120 after the user has operated the shutter button 201.

A liquid crystal rotation detector 125 detects whether the liquid crystal monitor 123 is open or closed and/or the rotational angle (rotation state) of the liquid crystal monitor 123, and sends the detection result to the controller 130. The controller 130 acquires information about whether the liquid crystal monitor 123 is open or closed and/or the rotational angle of the liquid crystal monitor 123 from the liquid crystal rotation detector 125, and stores this information in the buffer memory 124. In this embodiment, the controller 130 performs display processing so that the display state of the liquid crystal monitor 123 will be one that is easier for the user to see, on the basis of recognition of a specific subject and recognition of the acquired detection result.

The controller 130 controls the overall operation of the entire digital camera 100. The controller 130 records to the memory card 140 the image data stored in the memory buffer 124 after processing by the image processor 122 has ended. The controller 130 is constituted by a ROM that holds programs, a CPU that processes various information by executing programs, and so forth. The ROM stores programs related to file control, auto focus control (AF control), automatic exposure control (AE control), light emission control over the flash 160, and so on. The ROM also stores programs for the overall control of the operation of the entire digital camera 100.

The controller 130 has a facial recognition component 131 (an example of a subject detector) and a display controller 132. The facial recognition component 131 recognizes certain attributes (such as a person's face) on the basis of image data (subject images) acquired from the image processor 122, and outputs the recognition result as subject information. For example, the facial recognition component 131 is the result of the controller 130 executing a facial recognition program.

The display controller 132 controls whether or not to rotate the content displayed on the liquid crystal monitor 123, according to the detection result of the facial recognition component 131 and the detection result of the liquid crystal rotation detector 125. Examples of rotation of the image include rotating the image 180 degrees in a clockwise, or counter clockwise, direction; or flipping the vertical orientation to create a mirror image. For instance, the controller 130 performs display processing so that the display state of the liquid crystal monitor 123 is one that is easier for the user to see, on the basis of the subject information recognized by the facial recognition component 131 and the detection result obtained by the liquid crystal rotation detector 125 (this will be discussed in detail below).

The controller 130 may be constituted by a hard-wired electronic circuit, or may be constituted by a microprocessor or the like. Also, it may be constituted by a single semiconductor chip along with the image processor 122, etc. The ROM does not have to be provided inside the controller 130, and may instead be provided externally to the controller 130.

The memory buffer 124 is a memory unit that functions as a working memory for the image processing unit 122 and the controller 130. The buffer memory 124 can be a DRAM (dynamic random access memory) or the like. The flash memory 142 functions as an internal memory for recording image data and setting information or the like about the digital camera 100.

A card slot 141 is a connecting means that allows the memory card 140 to be inserted and removed. The card slot 141 allows the memory card 140 to be electrically and mechanically connected. The card slot 141 may also comprise a function of controlling the memory card 140.

The memory card 140 is an external memory that has a flash memory or other such recording component in its interior. The memory card 140 is able to record image data processed by the image processor 122.

The interface component 150 refers collectively to control buttons, control dials, and so forth provided to the exterior of the digital camera 100 and which are operated by the user. As shown in FIGS. 1 and 2, for example, the interface component 150 includes the shutter button 201, the moving picture release button 206, the zoom lever 202, the camera ON/OFF switch 203, the menu button 204, the cursor button 205, the mode switch 207, the mode dial 209, and the function button 210. The interface component 150 sends various operating command signals to the controller 130 when operated by the user.

The shutter button 201 is a two-stage push button that can be pushed half-way down or all the way down. When the shutter button 201 is pressed half-way down by the user, the controller 130 executes AF (auto focus) control and AE (auto exposure) control and decides on the imaging conditions. Then, when the shutter button 201 is pressed all the way down by the user, the controller 130 performs imaging processing. The controller 130 records the image data captured at the point when the button was pressed all the way down as a still picture to the memory card 140, etc. Hereinafter, when it is said simply that the shutter button 201 is pressed, it shall indicate that it was pressed all the way down.

The moving picture release button 206 is a push button for starting and ending moving picture recording. When the moving picture release button 206 is pressed by the user, the controller 130 continuously records the image data produced by the image processor 122 as a moving picture to the memory card 140, etc., on the basis of the image data produced by the CCD image sensor 120. When the moving picture release button 206 is pressed again, the recording of the moving picture ends.

The zoom lever 202 is a lever for adjusting the field angle between the wide angle end and the telephoto end, and is a type that automatically returns to its center position. When operated by the user, the zoom lever 202 sends the controller 130 an operating command signal for driving the zoom lens 112. Specifically, when the zoom lever 202 is operated to the wide angle end side, the controller 130 drives the zoom lens 112 so that the subject is captured in wide angle. Similarly, when the zoom lever 202 is operated to the telephoto end side, the controller 130 drives the zoom lens 112 so that the subject is captured in telephoto.

The camera ON/OFF switch 203 is a push button for switching the supply of power on and off to the various components of the digital camera 100 as directed by the user. When the camera ON/OFF switch 203 is pressed by the user when the power is off, the controller 130 supplies power to the various components of the digital camera 100, and actuates these components. When the camera ON/OFF switch 203 is pressed by the user when the power is on, the controller 130 halts the supply of power to the various components.

The menu button 204 is a push button. When the digital camera 100 is in imaging mode or reproduction mode, and the menu button 204 is pressed by the user, the controller 130 displays a menu screen on the liquid crystal monitor 123. A menu screen is a screen for setting various conditions for imaging and reproduction. The information set on the menu screen is recorded to the flash memory 142. When pressed while a setting category of the various conditions has been selected, the menu button 204 functions as an enter button.

The cursor button 205 consists of push buttons provided in the left, right, up, and down directions. The user can select various condition categories displayed on the liquid crystal monitor 123 by pressing the cursor button 205 in one of these directions.

The mode switch 207 is a push button provided in the up and down directions. The user can switch the state of the digital camera 100 between imaging mode and reproduction mode by pressing the mode switch 207 in one of these directions.

The mode dial 209 is a dial used to switch the scene mode. Scene mode is the collective name for modes set according to the imaging situation. One of a plurality of scene modes is set by turning the mode dial 209. The scene modes include, for example, landscape mode, portrait mode, nighttime mode, backlit mode, macro mode, and automatic scene determination mode. The automatic scene determination mode is one in which a mode selected from among landscape mode, portrait mode, nighttime mode, backlit mode, and macro mode, for example, is automatically set.

The function button 210 is a push button with which the user can set the desired function. The function button 210 can be assigned the function of restricting inversion of the image displayed on the liquid crystal monitor 123. As shown in FIG. 2, for example, the function button 210 is provided to the top face of the digital camera 100 and to the side of the display screen of the liquid crystal monitor 123.

The CCD image sensor 120 is an example of an imaging component. The liquid crystal monitor 123 is an example of a display component. The liquid crystal rotation detector 125 is an example of a means for detecting and acquiring the rotational state or the opened/closed state of the liquid crystal monitor 123. The facial recognition component 131 is an example of a subject detector.

2. Operation

2-1. Imaging Operation of Digital Camera 100

Figure 4:
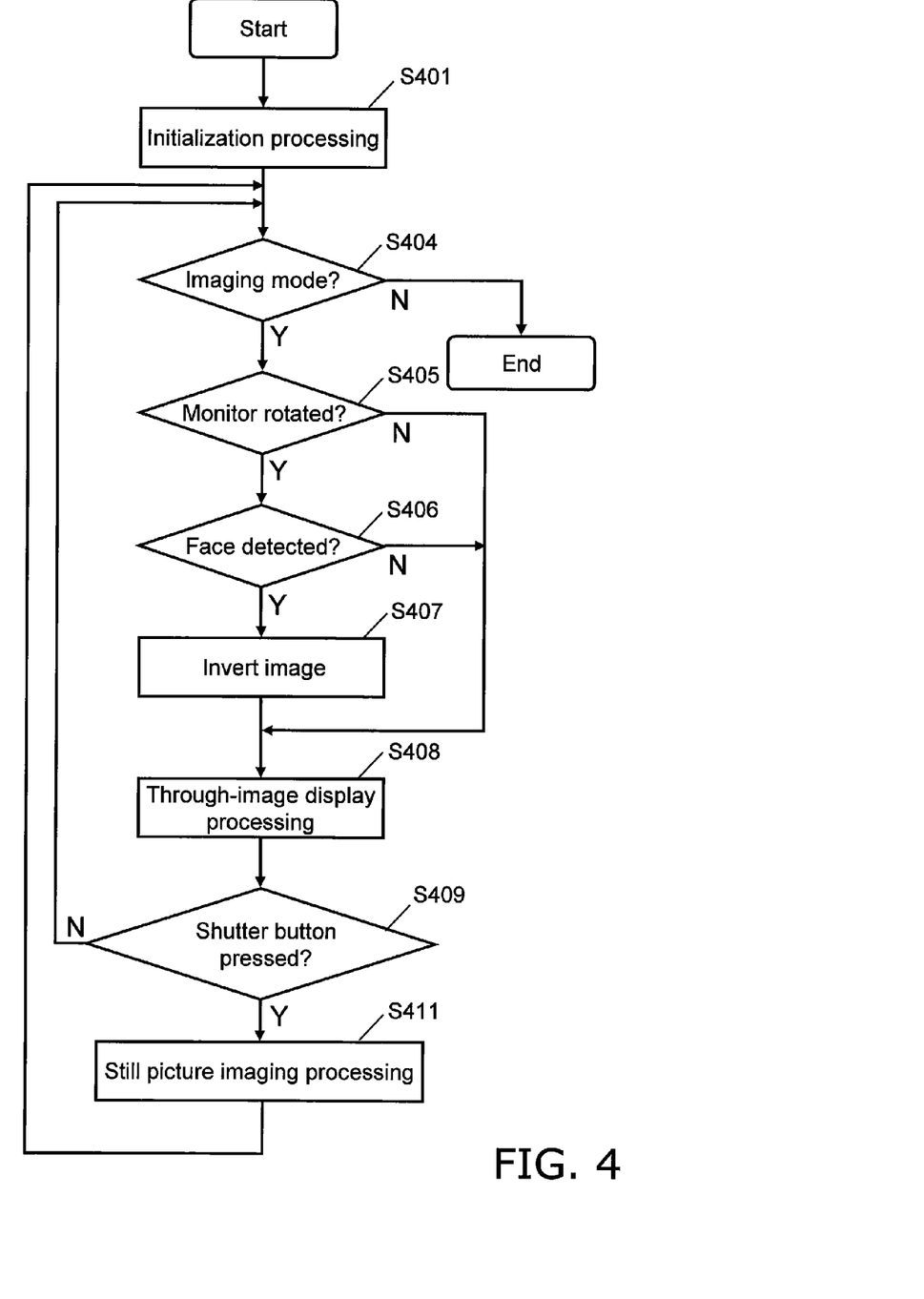
FIG. 4 is a flowchart of the processing in imaging mode pertaining to Embodiment 1.

Imaging control with the digital camera 100 will be described. The digital camera 100 displays an image in an orientation that is easier for the user to see by recognizing a certain subject and the rotation state of the liquid crystal monitor. FIG. 4 is a flowchart of imaging control when the digital camera 100 is in imaging mode. The digital camera 100 can capture still pictures and moving pictures in imaging mode. The capture of a still picture will be described here as an example.

The controller 130 performs the initialization processing necessary for still picture recording when imaging mode has been set by operation of the mode switch 207 by the user (S401).

Upon completion of the initialization, if the mode switch 207 is set to imaging mode, the controller 130 acquires rotation information about the liquid crystal monitor 123 from the liquid crystal rotation detector 125, and determines whether or not there has been rotation (S405). For example, a state in which the display screen of the liquid crystal monitor 123 is facing the rear face side is set to a rotational angle of zero degrees. In this case, using this state as a reference, it is determined that there is rotation when the rotation of the liquid crystal monitor 123 is at least 90 degrees (Yes in S405). Also, using this state as a reference, it is determined that there is no rotation when the rotation of the liquid crystal monitor 123 is less than 90 degrees (No in S405).

In step 405, if it has been determined that the liquid crystal monitor 123 has been rotated (Yes in S405), the facial recognition component 131 recognizes the subject image acquired from the image processor 122, and determines a certain image (S406). In this embodiment, an example will be described in which the certain image (an example of information used to specify the subject) is a facial image of a person. Specifically, the facial recognition component 131 detects and determines whether or not a person's facial image is included in the subject image.

In step 406, if it has been determined that a person's facial image is included in the subject image (Yes in S406), the controller 130 rotates the image displayed on the liquid crystal monitor 123 (S407). If it has been determined that a person's facial image is not included in the subject image (No in S406), the image displayed on the liquid crystal monitor 123 is not rotated.

Even if the orientation of the liquid crystal monitor 123 has been inverted (that is, rotated by at least 90 degrees) according to the determination processing of the above steps 405 to 407, the image display is not inverted if a certain subject image (facial image) is not shown (No in S406). Therefore, even though the orientation of the liquid crystal monitor 123 is greatly changed, such as when the user is imaging at a low angle, it is very likely that an image that is easy for the user to see will be displayed on the liquid crystal monitor 123.

In step 405, if it is determined that the liquid crystal monitor 123 has not been rotated (No in S405), the controller 130 repeatedly executes display processing and input confirmation processing from the user, including confirmation of the state of the mode switch 207 (S404), display of a through-image (S408), and monitoring the pressing of the shutter button 201 (S409). In step 404, the processing of imaging mode is ended if the state of the mode switch 207 is not imaging mode.

In step 409, the controller 130 performs through-image display processing according to the current settings related to display (S408). In through-image display processing, if it is detected in step 409 that the shutter button 201 has been pressed, the controller 130 performs processing to capture a still picture (S411).

3. Conclusion

As discussed above, the digital camera 100 in this embodiment comprises the CCD image sensor 120 that captures a subject and outputs image data, the liquid crystal monitor 123 that is capable of displaying an image on the basis of the image data and is capable of changing the orientation of a display screen, the rotation detector 125 that detects the orientation of the display screen of the display component, the facial recognition component 131 for detecting information related to a subject included in the image data, and the controller 130 for controlling whether or not to rotate the content displayed on the display component 123 according to the detection result of the facial recognition component 131 and the detection result of the rotation detector 125.

With this configuration, even when the orientation of the liquid crystal monitor 123 has been inverted (that is, rotated by at least 90 degrees), the system is controlled so that the display of the image is not inverted unless a certain image (such as a facial image) appears in the subject image. Therefore, even though the orientation of the liquid crystal monitor 123 is greatly changed, such as when the user is imaging at a low angle, it is very likely that an image that is easy for the user to see will be displayed on the liquid crystal monitor 123. As a result, the digital camera is more convenient to use.

4. Other Embodiments

The present invention is not limited to or by the above embodiment, and various other embodiments are conceivable. Other embodiments will be given below.

(A) In the above embodiment, the certain image recognized in the subject image was a person's facial image, but the certain image is not limited to being a facial image, and may be any image. For instance, the certain image may be an animal's facial image, a certain graphic image, a barcode, or the like.

(B) In the above embodiment, an example was given in which the display state was rotated when the liquid crystal monitor 123 was rotated and a certain image was recognized in the subject image. Instead of this, the display state may not be inverted when the liquid crystal monitor 123 is rotated and a certain image is recognized in the subject image.

(C) In the above embodiment, the recognition of a certain image in the subject image (information used to specify the subject) was given as a condition, but some other condition may be used instead. For instance, whether or not to rotate the display state may be decided according to scene mode information (information used to specify the subject). In this case, the specification of the scene mode corresponds to specification of the subject. Scene mode information is information used to identify a scene mode. A scene mode is set, for example, by operating the mode dial 209.

More specifically, specific identification information (value) is set for each of the landscape mode, portrait mode, nighttime mode, backlit mode, and macro mode. Consequently, when a given scene mode is selected, the controller 130 can confirm the scene mode by referring to the identification information (specific value) corresponding to the selected scene mode. Specifically, the controller 130 can decide whether or not to rotate the display state according to the scene mode. For example, if the scene mode is macro mode, the display controller 132 controls so that the content displayed on the liquid crystal monitor 123 is not rotated, regardless of the detection result of the buffer memory 124.

The control is the same when the scene mode is the automatic scene determination mode. For example, whether or not to rotated the display state can be decided as discussed above by having the controller 130 recognize the identification information corresponding to the selected scene mode in the automatic scene determination mode.

(D) In addition to the configuration of the above embodiment, the configuration may be such that the display of the liquid crystal monitor 123 is not rotated when the interface component 150 of the digital camera, such as the function button 210, is operated.

As shown in FIG. 6, for example, if the answer is Yes in step 406, it is determined in step 408b whether or not a specific button, such as the function button 210, was pressed. If the function button 210 was pressed (Yes in S408), the controller 130 controls the display of the liquid crystal monitor 123 so that it is not rotated (S410). On the other hand, if the function button 210 was not pressed (No in S408), the controller 130 does rotate the display of the liquid crystal monitor 123 (S409).

Consequently, even if the display state ends up being contrary to the user's intention, the user can change the display state to what was intended by operating the interface component 150.

Figure 5:
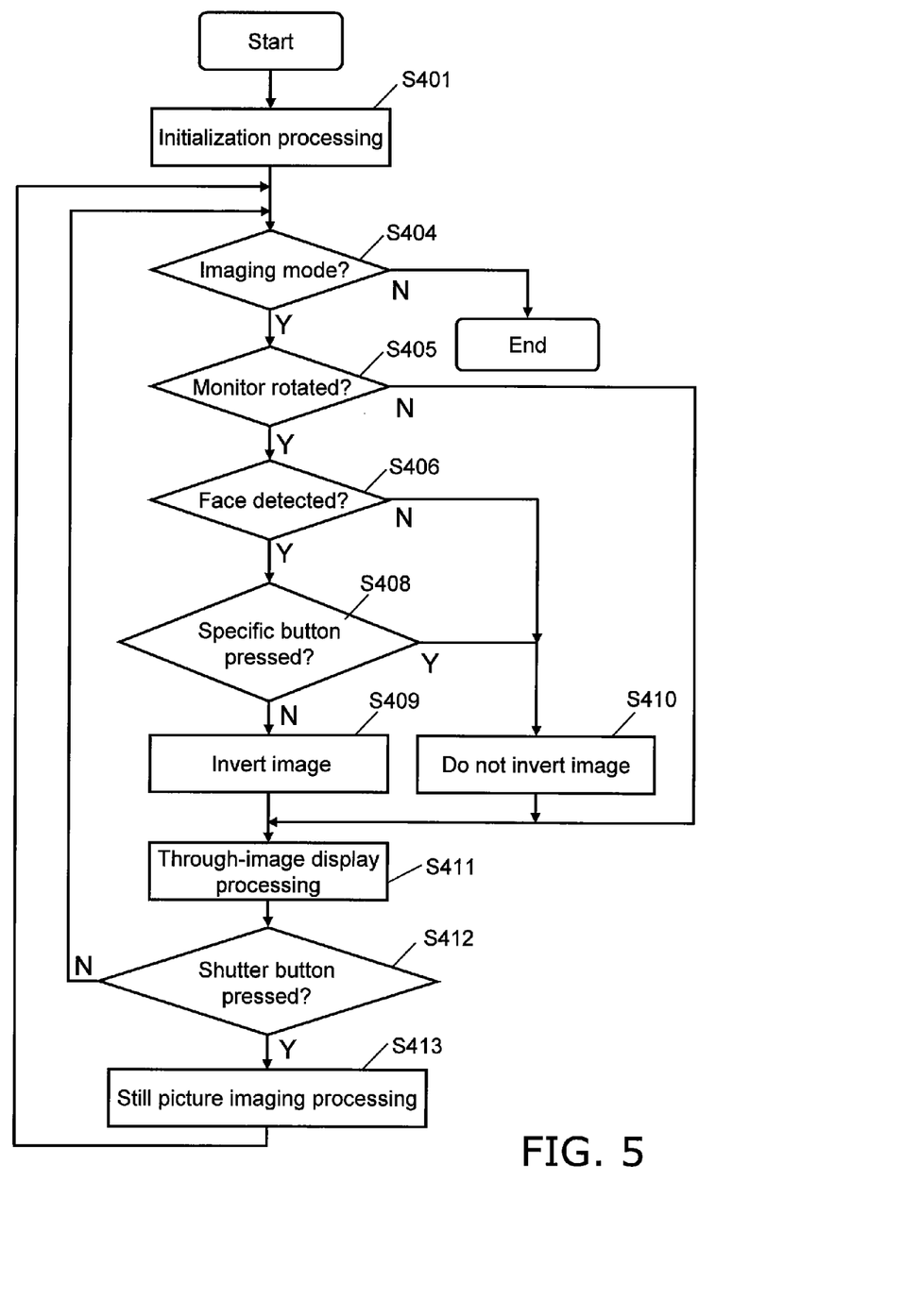
FIG. 5 is a flowchart of the processing in imaging mode pertaining to another embodiment.

In FIG. 5, only the portion for step 408 differs from FIG. 4. Therefore, only the step 408b portion was described here, and the steps other than step 408 will not be described. For those steps not described here, see FIG. 4.

(E) In the above embodiment, an example was given in which the imaging device was the digital camera 100, but as long as it is a vari-angle type of monitor, it may be a movie camera (video camera) or the like.

INDUSTRIAL APPLICABILITY

Since the present invention can provide an imaging device that is more convenient to use, it can also be applied to digital still cameras, movie cameras, portable telephones, smart phones, and so on.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device. Accordingly, these terms, as utilized to describe the technology disclosed herein should be interpreted relative to the imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
an imaging component configured to capture a subject, and output image data;
a display component configured to change its orientation and to display a face based on the image data, the display component including a display screen;
a rotation detector configured to detect the orientation of the display screen, and output rotation information; and
a controller including:
a subject detector configured to:
detect at least one subject attribute from the image data, and
output subject information based on the at least one attribute; and
a display controller configured to:
control the display component, and
determine whether to invert the face based on both the subject information and the rotation information.

2. The imaging device according to claim 1, wherein:
the face includes an animal's facial image.

3. The imaging device according to claim 1, wherein:
the display controller is further configured to maintain the orientation of the face displayed on the display screen intact when the rotation information indicates that the display component is rotated and when the subject information further includes information that identifies a scene mode.

4. The imaging device according to claim 3, wherein:
the scene mode is specified by the user.

5. The imaging device according to claim 3, wherein:
the scene mode is automatically detected.

6. The imaging device according to claim 3, wherein:
the scene mode comprises one of a landscape mode, a portrait mode, a nighttime mode, a backlit mode, or a macro mode.

7. The imaging device according to claim 1, further comprising:
an input component configured to receive input, and
wherein the display controller inverts the vertical orientation of the face displayed on the display screen based on the rotation information if the input component has received a specific input.

8. An imaging device comprising:
an imaging component configured to capture a subject, and output image data;
a display component including a display screen, the display component configured to change its orientation and to display an image on the display screen based on the image data;
a rotation detector configured to detect the orientation of the display screen, and output rotation information indicating whether the display component has been rotated; and
a controller including:
a subject detector configured to:
detect at least one subject attribute from the image data, and
output subject information based on the at least one attribute, the subject information indicating whether the image data includes a face; and
a display controller configured to:
control the display component, and
determine whether to invert the image based on both the subject information and the rotation information, invert the image when the rotation information indicates that the display component is rotated and when the subject information indicates that the image data includes the face, and maintain an orientation of the image displayed on the display screen intact when the rotation information indicates that the display component is rotated and when the subject information does not indicate that the image data includes the face.

9. The imaging device according to claim 8, wherein:
the display controller inverts a vertical orientation of the image when the rotation information indicates that the display component has been rotated and when the subject information indicates that the image data includes the face.

10. The imaging device according to claim 8, wherein:
the display controller keeps a vertical orientation of the image intact when the rotation information indicates that the display component has been rotated and when the subject information does not indicate that the image data includes the face.

11. The imaging device according to claim 8, wherein:
the display controller inverts the image on the display screen by rotating the image 180 degrees in the clockwise or counter-clockwise direction.

12. The imaging device according to claim 8, wherein:
the display controller inverts the image by flipping the vertical orientation of the image.

* * * * *